United States Patent [19]
Ferguson

[11] Patent Number: 5,335,422
[45] Date of Patent: Aug. 9, 1994

[54] TUBE VARIATION MEASURING DEVICE

[75] Inventor: Clayton L. Ferguson, Montezuma, Kans.

[73] Assignee: Farmland Industries, Inc., Kansas City, Mo.

[21] Appl. No.: 873,753

[22] Filed: Apr. 27, 1992

[51] Int. Cl.⁵ .............................. G01B 5/08; G01B 5/20
[52] U.S. Cl. ...................... 33/553; 33/555.2; 33/523
[58] Field of Search ................. 33/550, 551, 552, 553, 33/554, 555.1, 555.2, 501.02, 501.03, 501.04, 502, 523

[56] References Cited

U.S. PATENT DOCUMENTS

| | | |
|---|---|---|
| 2,260,354 | 10/1941 | Wallace ............................... 33/555.3 |
| 2,501,130 | 3/1950 | Kuppersmith . |
| 2,696,675 | 12/1954 | Case . |
| 2,801,475 | 8/1957 | Meyer, Jr. ............................ 33/555.1 |
| 2,910,862 | 11/1959 | Settzo ................................. 33/501.03 |
| 3,065,549 | 11/1962 | Antoszewski et al. . |
| 3,169,323 | 2/1965 | Hold . |
| 3,264,631 | 8/1966 | Ege .................................... 33/501.02 |
| 3,698,248 | 10/1972 | Vasek . |
| 3,898,885 | 8/1975 | Russell . |
| 3,965,745 | 6/1976 | Carey . |
| 4,065,969 | 1/1978 | Dinwiddie . |
| 4,141,149 | 2/1979 | George et al. . |
| 4,194,401 | 3/1980 | Claassen et al. . |
| 4,197,754 | 4/1980 | Ostendorf et al. . |
| 4,240,206 | 12/1980 | Baresh et al. . |
| 4,290,311 | 9/1981 | Brewer . |
| 4,389,788 | 6/1983 | Balogh et al. . |
| 4,404,854 | 9/1983 | Krempl et al. . |
| 4,420,980 | 12/1983 | Dunemann et al. . |
| 4,541,284 | 9/1985 | Guagliumi et al. . |
| 4,543,725 | 10/1985 | Golinelli et al. . |
| 4,706,501 | 11/1987 | Atkinson et al. . |
| 4,756,867 | 7/1988 | Blocquel . |
| 4,805,311 | 2/1989 | Fuchs ................................. 33/555.1 |
| 4,807,479 | 2/1989 | Sako et al. . |
| 4,925,619 | 5/1990 | Sparrow et al. . |
| 4,949,469 | 8/1990 | Wachtler . |
| 4,958,442 | 9/1990 | Eckhardt . |
| 4,976,151 | 12/1990 | Morishita . |
| 4,992,633 | 2/1991 | Cyphers . |

FOREIGN PATENT DOCUMENTS

| | | | |
|---|---|---|---|
| 1966060 | 2/1973 | Fed. Rep. of Germany | 33/550 |
| 1418147 | 10/1965 | France | 33/552 |
| 0160801 | 12/1980 | Japan | 33/501.02 |

*Primary Examiner*—Thomas B. Will
*Attorney, Agent, or Firm*—Kokjer, Kircher, Bowman & Johnson

[57] ABSTRACT

A self propelled device which travels along a reformer tube or other tube to detect variations in the tube diameter that may indicate impending failure of the tube. A two piece frame opens and closes about a hinge axis to allow application of the device to a tube and removal from the tube. When closed, wheels on the frame are held against the tube by a spring latch which allows the wheels to move in and out radially when diameter changes are encountered. One set of wheels is driven by an electric motor to propel the device along the tube. The diameter changes are sensed and measured by a linear variable differential transformer which monitors the gap between the ends of the frame sections. A chart recorder records the tube diameter measured at different positions along the tube length.

15 Claims, 2 Drawing Sheets

TUBE VARIATION MEASURING DEVICE

FIELD OF THE INVENTION

This invention relates generally to the measurement of the outside diameters of tubes and more particularly to a device which measures and records variations in the diameter of a tube such as a reformer tube.

BACKGROUND OF THE INVENTION

In the processing of petroleum, the petroleum reforming operation involves the use of reformer tubes which can be heated to temperatures in excess of 2000° F. In time, the creep that is induced by these high temperatures can cause the reformer tubes to fail. It is important that reformer tubes be replaced before they fail because failure of a tube during the reforming process can cause serious adverse consequences to the processing plant. Cracking tubes and other tubes used in various industrial processes are subject to the same problems.

In the past, it has been common practice to inspect reformer tubes through the use of ultrasonic techniques. However, ultrasonic inspections have not always succeeded in detecting reformer tubes that are on the verge of failing, and the reliability of the inspection procedure has suffered accordingly.

SUMMARY OF THE INVENTION

It is thus evident that a need remains for a way to accurately and reliably detect imminent failure of a tube such as a reformer tube. It is the principal goal of the present invention to meet that need.

More particularly, the present invention makes use of the bulging that occurs prior to failure of a reformer tube and detects such bulging in order to determine when replacement of the tube should be made. A bulge is detected by measuring the outside diameter of the reformer tube along its entire length and recording the measurements to detect any discrepancies that may be present. Diameter variations that are indicative of a bulge identify areas of the tube that may be subject to imminent failure.

In accordance with the invention, a device is constructed such that it can travel along a reformer tube or another tube under its own power and automatically measure and record the outside diameter of the tube with the precision that is necessary to detect a variation in the diameter that may indicate that failure is imminent. The device includes a frame which is formed by a pair of frame sections that are hinged together at one end so that they can be pivoted open to allow application to a reformer tube. The frame sections can be swung closed and are held in the closed position by a spring latch arrangement.

The frame is equipped with three sets of wheels, two sets of idler wheels and one set of driven wheels that are powered by an electric motor to propel the device along the tube. The springs incorporated in the latch mechanism hold the wheels against the outside of the tube and yet allow them to move radially in and out when a diameter variation such as a bulge is encountered. A conventional linear variable differential transformer (LVDT) detects the radial movement of the wheels by monitoring changes in the dimension of the gap between the ends of the frame sections opposite the hinged together ends. By measuring the radial movement of the wheels, the LVDT provides an accurate measurement of the tube diameter so that the presence of a bulge is indicated. A high speed chart recorder keeps a record of the tube diameter correlated to the position along the length of the tube.

In this fashion, the device quickly and automatically detects any bulges that are present on the reformer tube to identify any tube that requires inspection and possible replacement. The device is simple and economical to construct, easy to operate, and accurate and reliable in operation to measure the diameter of virtually any type of tube.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
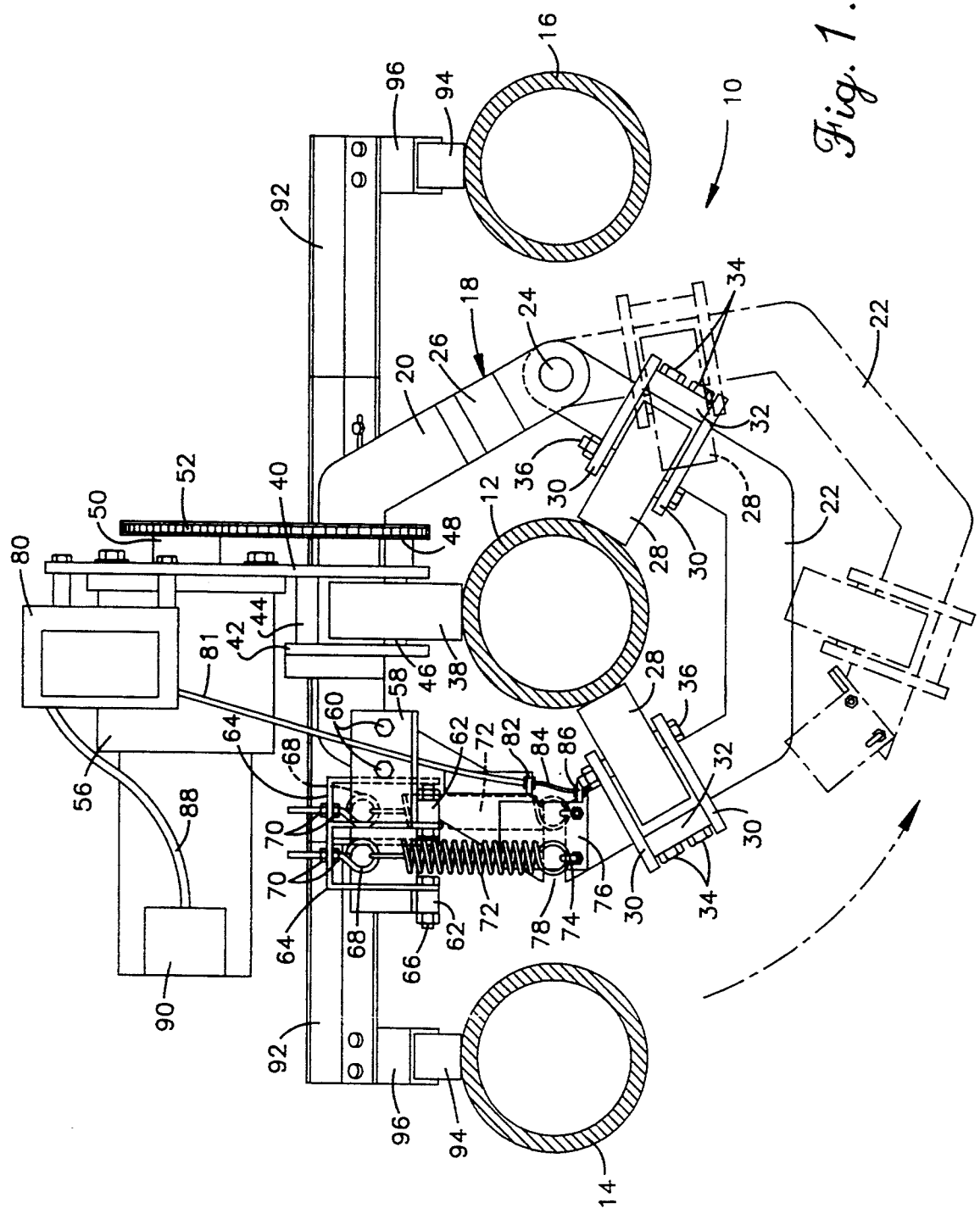
FIG. 1 is a top plan view of a device constructed according to a preferred embodiment of the present invention applied to a reformer tube in order to measure variations in the diameter of the tube, with the broken lines indicating the open position of the frame of the device.

Referring now to the drawings in more detail and initially to FIG. 1, numeral 10 generally designates a device which is constructed in accordance with the present invention and which is used to measure variations in the diameters of tubes such as the upright reformer tubes identified by numerals 12, 14 and 16 in FIG. 1. The reformer tubes are used in the reforming of petroleum and are subjected to high temperatures which may exceed 2000° F. The high temperatures can cause the reformer tubes to become deformed and fail. Prior to failure, the tubes are deformed in a manner to bulge outwardly at the area of the prospective failure, and the diameter of the tubes at such locations is thus increased compared to the diameter of the rest of the tube.

The tube variation measuring device 10 is depicted as applied to tube 12. The other tubes 14 and 16 are located on opposite sides of the tube 12 and are used to prevent the device 10 from rotating on tube 12, as will be explained more fully.

Figure 3:
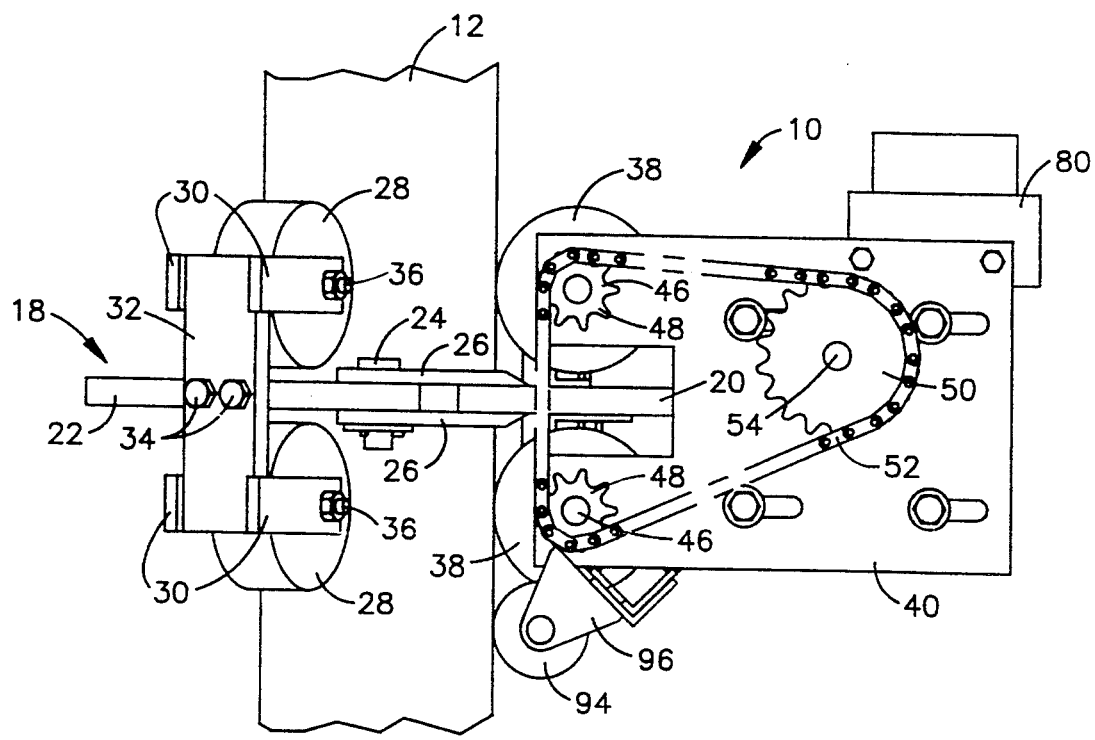
FIG. 3 is a side elevational view of the device taken from the opposite or hinge side of the frame.

The device 10 has a frame which is generally identified by numeral 18 and which has the shape of a hexagon when closed in the solid line position of FIG. 1. The frame 18 is somewhat larger than the diameter of the reformer tube 12. The frame 18 includes two frame sections 20 and 22, each of which takes the form of a doubly bent arm providing one-half of the hexagon. The adjacent ends of the frame sections 20 and 22 are connected for hinged movement relative to one another by a hinge pin 24 which has a vertical orientation during use of the device 10. As best shown in FIG. 3, a pair of hinge leaves 26 are rigidly secured to the end of frame section 20 and receive the end of frame section 22 between them. The hinge pin 24 is extended through the leaves 26 and through the end of frame section 22 in order to secure the two frame sections together.

The frame 18 can be opened by swinging frame section 22 about the hinge pin 24 to the position shown in broken lines in FIG. 1. In this position of the frame, the ends of the frame sections 20 and 22 opposite the hinged ends are spread well apart so that the frame can be applied to the reformer tube 12 or removed from the reformer tube. When the frame section 22 is swung to the closed position shown in solid lines in FIG. 1, the frame 18 extends around the reformer tube 12 with the ends of the frame sections 20 and 22 opposite the hinged ends close together although spaced apart slightly.

Frame section 22 carries two sets of idler wheels 28. Each set of idler wheels includes two wheels 28 which are mounted one above the other between small sets of plates 30. The plates 30 are connected with a vertical back plate 32 which is in turn secured to the frame section 22 by suitable fasteners 34. Each wheel 28 is mounted between the corresponding plates 30 for rotation about an axle 36 which may take the form of a bolt. One wheel 28 in each set of idler wheels is located above the frame section 22 and the other wheel in each set is located below the frame section. The axles 36 are perpendicular to the axis of the hinge pin 24 so that the idler wheels 28 rotate about horizontal axes when the device 10 is in use.

The other frame section 20 is provided with a pair of driven wheels 38. Wheels 38 are spaced one above the other, with one of the wheels above frame section 20 and the other below the frame section. Each wheel 38 is mounted for rotation between a large mounting plate 40 on one side and a smaller plate 42 (see FIG. 1) on the other side. The large plate 40 is connected with the smaller plates 42 by bars 44. The plates 40 and 42 are suitably secured to the frame section 20 near its center.

The driven wheels 38 are mounted on axles 46 which are rotatable on the plates 40 and 42. One end of each axle 46 carries a sprocket 48. A larger sprocket 50 drives both of the sprockets 48 through a drive chain 52 which is drawn tightly around all three sprockets. The large sprocket 50 is carried on the end of an output shaft 54 of a DC electric motor 56. The motor 56 is mounted on plate 40.

Through this drive system, wheels 38 are driven by the motor 56. The motor is preferably reversible in order to permit the device to be driven in opposite directions along the tube 12. When the frame is closed on the reformer tube 12, the wheels 28 and 38 are spaced equidistantly around the circumference of the reformer tube at 120° intervals. The rotational axes of the wheels are perpendicular to the longitudinal axes of the reformer tube so that the wheels are able to roll lengthwise along the outside surface of the tube.

Figure 2:
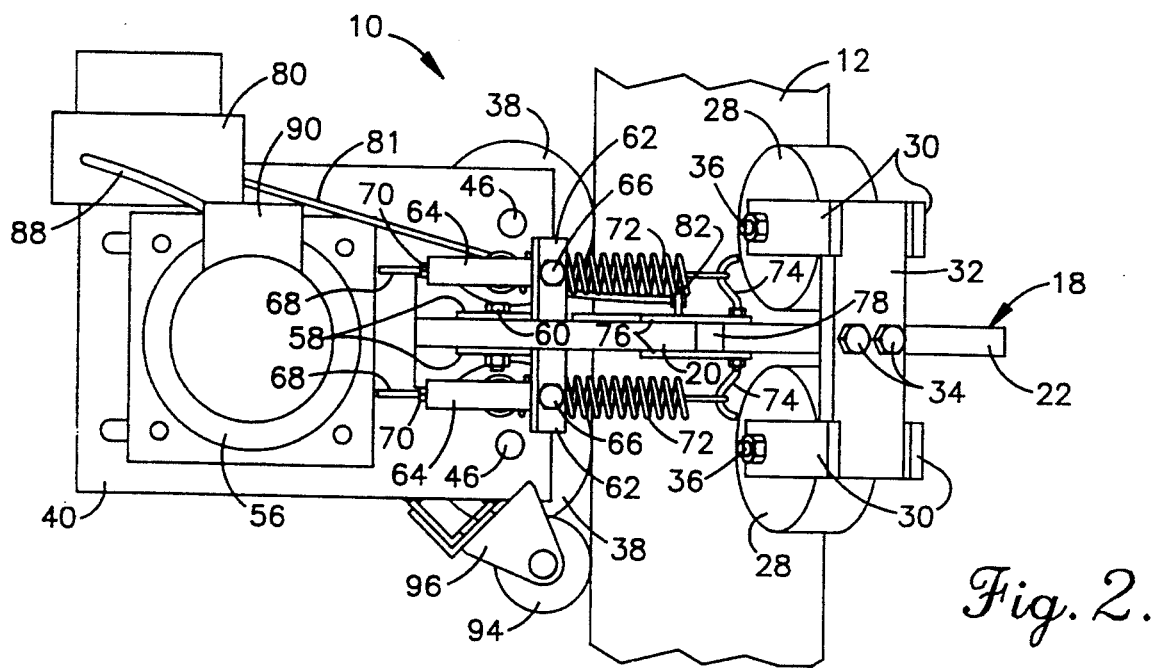
FIG. 2 is a side elevational view of the device shown in FIG. 1 taken from the side of the latching arrangement which holds the frame closed on the reformer tube.

The frame 18 may be releasably held in the closed position by a latch arrangement. Bracket plates 58 are secured to the top and bottom surfaces of frame section 20 by a pair of bolts 60. Bars 62 extend from the bracket plates 58 for the mounting of U-shaped brackets 64 which are secured to the bars by bolts 66. As best shown in FIG. 2, one of the brackets 64 is located above frame section 20 while the other bracket 64 is located below the frame section. Eye-bolts 68 are connected by nuts 70 to the bight portions of the brackets 64.

A pair of tension springs 72 perform the latching function. One end of each spring 72 is hooked to one of the eye-bolts 68. When the frame 18 is in the closed position, the opposite ends of the springs 72 may be hooked to hooks 74 which project from the other frame section. The hooks 74 extend from plates 76 which are secured to project from the end of frame section 22 and which receive the end of the other frame section 20 between them when the frame is closed. One of the hooks 74 projects upwardly and receives the upper tension spring 72. The other hook 74 projects downwardly and receives the end of the lower tension spring 72.

The action of the tension springs 72 holds the frame 18 in the closed position and maintains the wheels 28 and 38 firmly against the outside surface of the tube 12. When the device 10 is applied to the tube 12, a gap 78 is presented between the adjacent ends of the two frame sections 20 and 22. The gap is normally about one-half inch, although other dimensions can be selected. It is noted that when a section of the tube 12 is encountered which is larger in diameter than the remainder of the tube, the wheels 28 and 38 move radially outwardly on the tube in order to traverse the large diameter section of the tube. As this occurs, the frame sections 20 and 22 swing apart slightly about the hinge axis 24, and the gap 78 widens in proportion to the increased diameter of the tube. When the large diameter section of the tube is passed, the springs 72 pull the frame sections together to maintain the wheels on the surface of the tube and return the gap 78 to its normal dimension.

Because the dimension of the gap 78 is proportional to the diameter of the tube 12, the gap dimension is continuously monitored to provide an indication of the tube diameter. Monitoring of the gap is carried out by a suitable sensor 80 which is mounted on the bracket plate 40 and which may take the form of a conventional linear variable differential transformer (LVDT). The LVDT 80 has a cable 81 projecting from it. The end of the cable sheath is secured to a bracket 82 on frame section 20. The cable sheath encloses a wire 84 which extends out of the end of the cable sheath and across the gap 78. The end of wire 84 butts against a tab 86 (FIG. 1) secured to frame section 22. The wire 84 extends into the casing of the LVDT 80 and carries a core which moves within a magnetic field that senses the core position. The wire 84 is spring loaded outwardly. When the gap 78 widens, the wire 84 extends the same distance under the influence of its spring load, and the core of the LVDT moves proportionally. Conversely, narrowing of the gap 78 causes the tab 86 to push the wire 84 inwardly against its spring load. The core of the LVDT moves proportionally in the same direction. In this fashion, the LVDT 80 continuously monitors the dimension of the gap 78 and thus continuously monitors the diameter of the tube 12 along which the device 10 is traveling.

The information which the LVDT 80 provides is transmitted by means of a cable 88 to a monitoring device 90 mounted on the motor 56. The monitoring device keeps track of the number of rotations of the motor and thus monitors the location of the device 10 along the length of the tube 12. The monitoring device 90 correlates the tube diameter information provided by the LVDT 80 with the position along the tube 12 so that the correlated data can be processed by a conventional chart recorder (not shown) which prints out a record of the diameter of the tube correlated to the distance along the tube.

Adjustable arms 92 project from frame section 20 in opposite directions. Each arm 92 carries on its end a guide wheel 94 which is mounted for rotation on a bracket 96 secured to the arm 92. The arms 92 are adjustable in length and are arranged such that the wheels 94 engage the reformer tubes 14 and 16 on opposite sides of the tube 12 that is undergoing measurement. By reason of the engagement of the wheels 94 against the reformer tubes 14 and 16, the device 10 is restrained from rotating on the reformer tube 12 as it is driven along the length of the tube.

In operation of the device 10, the frame is moved to the open position by releasing the ends of the springs 72 from the hooks 74 and swinging arm 22 to the broken line position shown in FIG. 1. The frame 18 can then be applied to the tube 12 and may be closed on the tube and held in the closed position by hooking the springs 72 onto the hooks 74. The device 10 is initially applied to the bottom of the reformer tube 12, and the motor 56 is then energized in a directional mode to propel the device upwardly along the length of the reformer tube. As the device moves along the tube 12, the diameter of the tube is continuously measured by the LVDT 80, and the chart recorder provides a printout of the diameter at various positions along the length of the tube. If a diameter of the tube is sensed that is indicative of a bulge that could indicate impending failure of the tube, the location of the bulge is indicated and the tube can then be inspected and replaced if necessary.

When the device has reached the top of the reformer tube 12, the direction of the motor operation is reversed to return the device to the bottom of the tube. When the device has reached the bottom of the tube, the springs 76 can be released from the hooks 74 and the frame can be opened so that the device can be removed from the reformer tube 12 and thereafter applied to measure another reformer tube in the same manner.

Although it is contemplated that the device of the present invention finds its primary use in detecting variations in the diameters of reformer tubes and similar industrial tubes that are exposed to high temperatures, the device is also applicable to measure the diameter variation of virtually any type of tube or pipe. It is contemplated that the device 10 will be provided in different sizes to measure tubes which differ significantly in diameter, with the size of the frame 18 being selected to provide a suitable gap 78 when the device is closed on the tube that is being measured.

Although the specific embodiment that is shown and described uses the LVDT 80 to measure the changes in the gap 78 in order to measure diameter variations, other techniques can be employed. For example, an angle monitoring instrument can be used to measure changes in the angle between the frame sections 20 and 22 at the hinge joint 24 because changes in this angle are proportional to changes in the diameter of the tube. Other techniques which essentially measure the in and out radial movement of the wheels can also be used with satisfactory results.

The LVDT 80 may be Trans-Tek Model 243-000 DC-DC having a working range of plus or minus ½ inch and providing a full scale output of approximately 10 volts with 24 volt DC excitation. The chart recorder may be Western Graphtec Model WR-7800-4 four channel chart recorder. The motor may be a ½ horsepower gear motor which delivers 235 inch pounds of torque and drives the device along the tube at a rate of approximately 3 inches per second. With these components, the device of the present invention is able to automatically, continuously and rapidly measure and record the outside diameter of a tube within 0.001 inch.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. Apparatus for detecting changes in the diameter of a tube, said apparatus comprising:

a frame comprising a pair of frame sections each having opposite first and second ends and means for connecting the first ends of said frame sections together for pivotal movement between an open condition for insertion onto the tube and for removal therefrom and a closed condition of the frame, said frame sections together extending around the tube in the closed condition with the second ends of said frame section adjacent to but spaced apart from one another to form a gap therebetween;

a plurality of rotatable wheels on said frame engaging the outside of the tube in the closed condition of the frame and mounted on the frame to roll along the outside of the tube in a longitudinal direction thereon;

power means for driving some of said wheels to propel said frame longitudinally along the tube;

yieldable means for holding said frame in the closed condition while accommodating pivotal movement of said wheels radially of the tube when the tube diameter changes as the frame moves longitudinally along the tube; and means for detecting variations in the tube diameter as the frame moves along the tube by detecting changes in the dimension of said gap between the second ends of said frame sections.

2. Apparatus as set forth in claim 1, wherein said yieldable means comprises spring means extending between the second ends of said frame sections.

3. Apparatus as set forth in claim 1, wherein said wheels are arranged in plural sets with each set including a pair of wheels, each pair including one wheel located above the frame and one wheel located below the frame.

4. Apparatus as set forth in claim 1, including means for preventing the frame from rotating on the tube about the longitudinal axis thereof.

5. Apparatus for detecting changes in the diameter of an upright reformer tube subjected to high temperatures which can deform the tube, said apparatus comprising:

a frame having two frame sections hinged together for pivotal movement about a hinge axis between an open condition for insertion onto the tube and removal therefrom and closed condition for use to detect diameter changes in the tube;

a plurality of wheels on said frame engaging the tube when said frame is in the closed condition and oriented to roll longitudinally along the tube to guide the frame therealong;

power means for driving one or more selected wheels to propel said frame along the tube, said means comprising a motor and a drive train connecting said motor to the selected wheels for driving said selected wheels along the tube;

yieldable means acting in a manner to retain the frame in the closed condition and yielding to accommodate pivotal movement of the frame radially of the tube when the tube diameter changes as the frame moves longitudinally along the tube; and means for detecting variations in the diameter of the tube as the frame moves along the tube.

6. Apparatus as set forth in claim 5, wherein:

said frame being applicable to and removable from the tube from the side thereof in the open position and said frame sections are spaced apart in the closed position to present a gap remote from said hinge axis; and said detecting means operates to detect changes in the dimension of said gap to thereby detect variations in the tube diameter.

7. Apparatus as set forth in claim 5, wherein:

said frame has two frame sections hinged together for pivotal movement about a hinge axis between open and closed positions, said frame being applicable to and removable from the tube from the side thereof in the open position and said frame sections are spaced apart in the closed position to present a gap remote from said hinge axis; and said yieldable means comprises a pair of springs extending across said gap between the frame sections, one spring being located above the frame and the other being located below the frame.

8. Apparatus as set forth in claim 5, wherein said wheels are arranged in plural sets with each set including a pair of wheels, each pair including one wheel located above the frame and one wheel located below the frame.

9. Apparatus as set forth in claim 8, wherein:

said frame has two frame sections hinged together for pivotal movement about a hinge axis between open and closed positions, said frame being applicable to and removable from the tube from the side thereof in the open position and said frame sections are spaced apart in the closed position to present a gap remote from said hinge axis; and said yieldable means comprises a pair of springs extending across said gap between the frame sections, one spring being located above the frame and the other being located below the frame.

10. Apparatus as set forth in claim 5, including means for preventing rotation of the frame on the reformer tube.

11. Apparatus for detecting changes in the diameter of an upright reformer tube located between second and third reformer tubes and subjected to high temperatures which can deform the tube, said apparatus comprising:

a frame having two frame sections hinged together for pivotal movement about a hinge axis between open and closed positions, said frame being applicable to and removable from the tube from the side thereof in the open position;

a plurality of wheels on said frame engaging the tube in the closed position of the frame and oriented to roll longitudinally along the tube to guide the frame therealong;

a pair of arms extending from said frame in opposite directions;

a pair of guide elements carried on the respective arms and engaging the second and third reformer tubes in a manner to preclude rotation of the frame on the first mentioned tube during movement of the frame along the first tube;

power means for driving selected wheels to propel said frame along the tube;

yieldable means acting on said frame sections in a manner to retain the frame in the closed position and yielding to accommodate pivotal radial movement of the frame sections about said hinge axis as said wheels travel along parts of the tube which differ in diameter; and means for measuring the radial movement of said wheels to measure variations in the diameter of the tube.

12. Apparatus for detecting changes in the diameter of a tube, said apparatus comprising:

a frame having a pair of frame sections hinged together at one end and having opposite ends adjacent one another in a closed position of the frame, said frame having an open position wherein said frame sections are pivoted apart about a hinge axis at said one end to spread said opposite ends to permit application of the frame to the tube and removal of the frame therefrom;

at least three rotatable wheels on said frame engaging the outside of the tube in the closed position of the frame and mounted on the frame equidistant apart from one another to roll along the outside of the tube in a longitudinal direction thereon;

power means for driving some of said wheels to propel said frame along the tube;

spring means spanning the opposite ends of said frame section and urging said opposite ends together to maintain said wheels against the tube, said spring means being yieldable to allow the wheels to move radially of the tube when traversing parts of said tube which differ in diameter; and means for measuring the radial movement of said wheels to measure variations in the tube diameter along the length thereof.

13. Apparatus as set forth in claim 12, wherein said measuring means operates to measure the distance between said opposite ends of the frame sections to thereby measure variations in the tube diameter.

14. Apparatus as set forth in claim 12, wherein said wheels are arranged in at least three plural sets with each set including a pair of wheels, each pair including one wheel located above the frame and one wheel located below the frame.

15. Apparatus as set forth in claim 12, wherein said spring means comprises a pair of springs each connected between said opposite ends of the frame sections, one spring being located below the frame and the other spring being located above the frame.

* * * * *